US012250458B2

United States Patent
Kang et al.

(10) Patent No.: US 12,250,458 B2
(45) Date of Patent: Mar. 11, 2025

(54) INTEGRATED VISUAL-INERTIAL ODOMETRY AND IMAGE STABILIZATION FOR IMAGE PROCESSING

(71) Applicant: QUALCOMM Incorporated, San Diego, CA (US)

(72) Inventors: Xueyang Kang, Taiyuan (CN); Shunying Yuan, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 18/035,479

(22) PCT Filed: Jan. 4, 2021

(86) PCT No.: PCT/CN2021/070099
§ 371 (c)(1),
(2) Date: May 4, 2023

(87) PCT Pub. No.: WO2022/141620
PCT Pub. Date: Jul. 7, 2022

(65) Prior Publication Data
US 2023/0421902 A1    Dec. 28, 2023

(51) Int. Cl.
*H04N 23/68*      (2023.01)
*G06T 5/20*      (2006.01)
(Continued)

(52) U.S. Cl.
CPC ............. *H04N 23/683* (2023.01); *G06T 5/20* (2013.01); *G06T 7/70* (2017.01); *H04N 23/617* (2023.01);
(Continued)

(58) Field of Classification Search
None
See application file for complete search history.

(56) References Cited

U.S. PATENT DOCUMENTS

| 10,412,305 B2 | 9/2019 | Jefremov et al. |
| 2014/0303687 A1* | 10/2014 | Wall, III ............... A61F 9/08 |
| | | 607/54 |

(Continued)

FOREIGN PATENT DOCUMENTS

| CN | 1571475 A | 1/2005 |
| CN | 103563349 A | 2/2014 |

(Continued)

OTHER PUBLICATIONS

Supplementary European Search Report—EP21912403—Search Authority—The Hague—Sep. 6, 2024 (10 pp).

(Continued)

*Primary Examiner* — Paul M Berardesca
(74) *Attorney, Agent, or Firm* — Shumaker & Sieffert, P.A./QUALCOMM

(57) ABSTRACT

An example method for image processing includes receiving a first set of information, the first set of information being indicative of angular velocity and movement of the device based on a change in position of the device across a current frame captured by the device and a subsequent frame captured by the device, filtering the first set of information to compensate for unintentional movement of the device to generate a second set of information, the second set of information being indicative of angular velocity and movement of the device without unintentional movement, performing image stabilization on the current frame based on both the first set of information and the second set of information to generate an image stabilized current frame, and outputting, for display, the image stabilized current frame.

30 Claims, 6 Drawing Sheets

(51) Int. Cl.
*G06T 7/70* (2017.01)
*H04N 23/617* (2023.01)

(52) U.S. Cl.
CPC ..... *H04N 23/6811* (2023.01); *H04N 23/6812* (2023.01); *H04N 23/6815* (2023.01); *G06T 2207/30244* (2013.01)

(56) References Cited

U.S. PATENT DOCUMENTS

| | | |
|---|---|---|
| 2017/0078576 A1 | 3/2017 | Ryu et al. |
| 2017/0134658 A1 | 5/2017 | Miyahara |
| 2019/0204123 A1* | 7/2019 | Zhao ................... G01S 17/06 |
| 2019/0222760 A1* | 7/2019 | Takeuchi ........... H04N 23/6815 |
| 2019/0260934 A1 | 8/2019 | Li et al. |
| 2020/0077022 A1* | 3/2020 | Lustig ................ H04N 23/6812 |
| 2021/0006721 A1* | 1/2021 | Yasuda ............... H04N 23/6815 |
| 2022/0103734 A1* | 3/2022 | Halmetschlager-Funek ................ H04N 23/6811 |

FOREIGN PATENT DOCUMENTS

| | | |
|---|---|---|
| CN | 106856551 A | 6/2017 |
| CN | 107026970 A | 8/2017 |
| EP | 0757480 B1 | 6/2005 |
| WO | 2018072353 A1 | 4/2018 |

OTHER PUBLICATIONS

International Search Report and Written Opinion—PCT/CN2021/070099—ISA/EPO—Sep. 17, 2021 (10 pp).

* cited by examiner

INTEGRATED VISUAL-INERTIAL ODOMETRY AND IMAGE STABILIZATION FOR IMAGE PROCESSING

This application is a national stage application under 35 U.S.C. § 371 of PCT Application No. PCT/CN2021/070099, filed Jan. 4, 2021. The entire content of PCT Application No. PCT/CN2021/070099 is incorporated herein by reference as if fully set forth below in its entirety and for all applicable purposes.

TECHNICAL FIELD

The disclosure relates to image processing.

BACKGROUND

A camera device includes one or more cameras that capture frames (e.g., images and/or videos). Examples of the camera device include stand-alone digital cameras or digital video camcorders, camera-equipped wireless communication device handsets, such as mobile telephones having one or more cameras, cellular or satellite radio telephones, camera-equipped personal digital assistants (PDAs), panels or tablets, gaming devices, computer devices that include cameras, such as so-called "web-cams," or any device with digital imaging or video capabilities.

The camera device may be configured to perform visual-inertial odometry (VIO) for estimating pose and velocity of the camera device based on images captured by the camera device. The camera device may also be configured to perform image stabilization to reduce blurring effect caused by motion of the camera device during exposure.

SUMMARY OF THE INVENTION

In general, this disclosure describes techniques for integrating visual-inertial odometry (VIO) and image stabilization by utilizing tracking filters that compensate for unintentional movement of a camera device. The result of the filtering may be angular velocity and movement information without the unintentional movement to perform image stabilization on a frame. The camera device may then utilize the image stabilized frame for determining position and orientation of the camera device as part of VIO.

By integrating the VIO and image stabilization, the example techniques may improve the overall image stabilization, resulting in better image quality and less blurriness, as well as improve the position and orientation (pose) information obtained via VIO. Furthermore, due to the integration, computation resources for VIO and image stabilization can be shared, resulting in a better operating camera device (e.g., with less power utilization and fewer computational resources).

In one example, this disclosure describes a device for image processing that includes a memory and one or more processors coupled to the memory, the one or more processors configured to: receive a first set of information, the first set of information being indicative of angular velocity and movement of the device based on a change in position of the device across a current frame captured by the device and a subsequent frame captured by the device, filter the first set of information to compensate for unintentional movement of the device to generate a second set of information, the second set of information being indicative of angular velocity and movement of the device without unintentional movement, perform image stabilization on the current frame based on both the first set of information and the second set of information to generate an image stabilized current frame, and output, for display, the image stabilized current frame.

In another example, this disclosure describes a method for image processing, the method including receiving a first set of information, the first set of information being indicative of angular velocity and movement of the device based on a change in position of the device across a current frame captured by the device and a subsequent frame captured by the device, filtering the first set of information to compensate for unintentional movement of the device to generate a second set of information, the second set of information being indicative of angular velocity and movement of the device without unintentional movement, performing image stabilization on the current frame based on both the first set of information and the second set of information to generate an image stabilized current frame, and outputting, for display, the image stabilized current frame.

In another example, this disclosure describes a computer-readable storage medium storing instructions thereon that when executed cause one or more processors to: receive a first set of information, the first set of information being indicative of angular velocity and movement of the device based on a change in position of the device across a current frame captured by the device and a subsequent frame captured by the device, filter the first set of information to compensate for unintentional movement of the device to generate a second set of information, the second set of information being indicative of angular velocity and movement of the device without unintentional movement, perform image stabilization on the current frame based on both the first set of information and the second set of information to generate an image stabilized current frame, and output, for display, the image stabilized current frame.

In another example, this disclosure describes a device for image processing that includes means for receiving a first set of information, the first set of information being indicative of angular velocity and movement of the device based on a change in position of the device across a current frame captured by the device and a subsequent frame captured by the device, means for filtering the first set of information to compensate for unintentional movement of the device to generate a second set of information, the second set of information being indicative of angular velocity and movement of the device without unintentional movement, means for performing image stabilization on the current frame based on both the first set of information and the second set of information to generate an image stabilized current frame, and means for outputting, for display, the image stabilized current frame.

The details of one or more examples are set forth in the accompanying drawings and the description below. Other features, objects, and advantages will be apparent from the description, drawings, and claims.

DETAILED DESCRIPTION OF THE EMBODIMENTS

Figure 1:
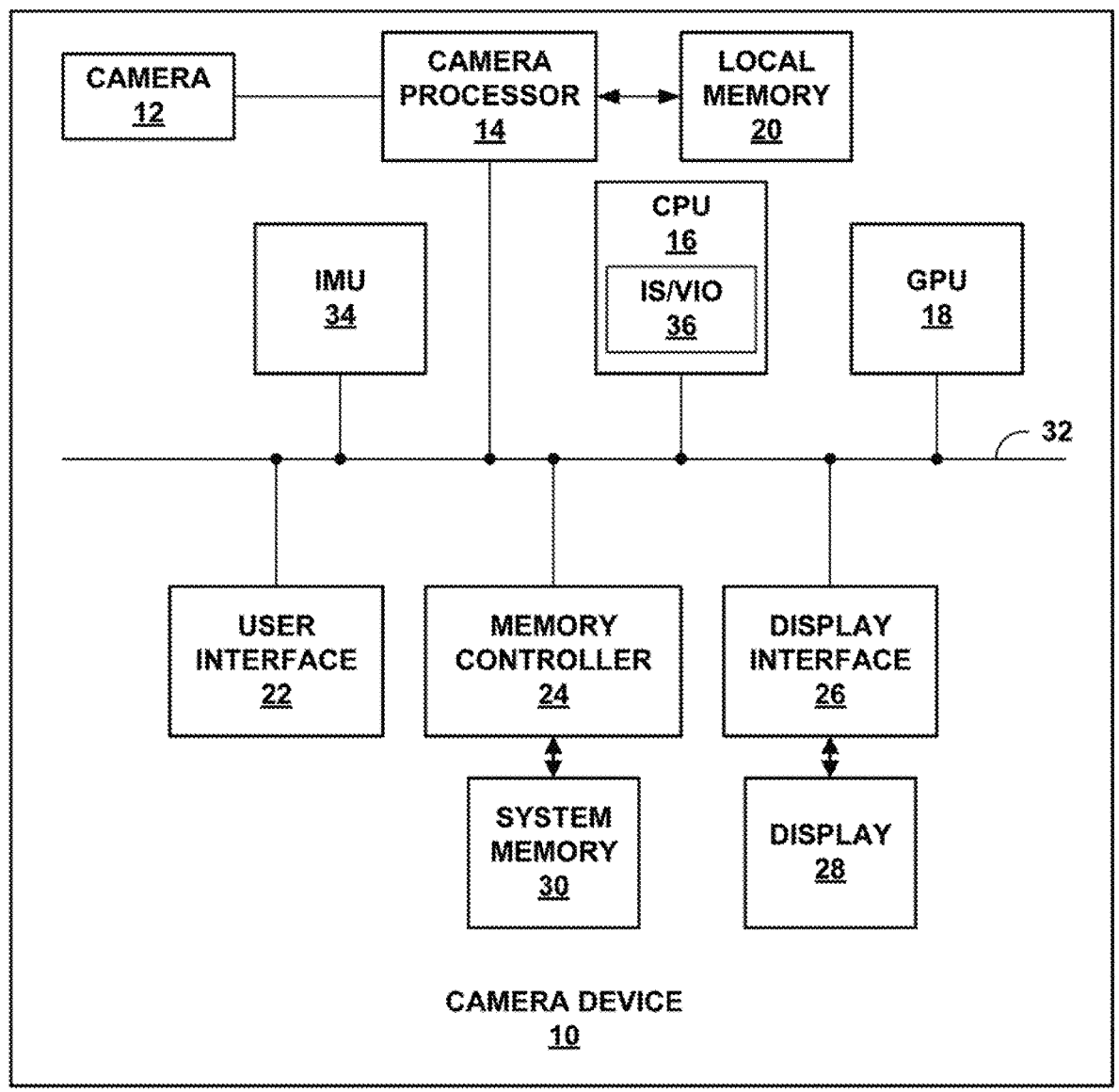
FIG. 1 is a block diagram of a device configured to perform one or more of the example techniques described in this disclosure.

The example techniques described in this disclosure relate to image stabilization and visual-inertial odometry (VIO). VIO is a technique to estimate state (e.g., position and orientation (pose) and velocity) of a device by using images captured by a camera of the device and information indicative of the angular velocity and/or movement of the device (e.g., based on output from inertial measurement unit (IMU) and/or accelerometer). The movement of the device may cause high-speed motion jitter and random noise that results in the image used for VIO to be blurry. Because the image used for VIO is blurry, there may be error in the localization of device. The error in the localization of the device may refer to error or even failure in the determination of the pose and velocity of the device and error or even failure in the determination of the location and position of other objects in the image.

In VIO techniques, based on the output of the IMU for two consecutive frames of image data, it may be possible for the device to determine the pose of the device. Also, the device may be able to estimate the pixel coordinates of feature points in a next frame. In this way, the device performs feature tracking, which may be useful for fast motion. Based on the feature tracking, the device may determine its current pose and location of objects in the frame for mapping the area surrounding the device. As one example, the gravity vector from the IMU (e.g., accelerometer of the IMU) can be used to convert the estimated position of the device into a world frame for navigation.

However, there may be errors relying on the output from the IMU for VIO techniques if there are blurry images. For instance, a loose connection in the IMU may result in vibration. Also, tracking of feature points may be not be reliable in blurry images.

Image stabilization is an example way in which to reduce the blurriness of an image, and is generally a separate operation from the VIO. For instance, image stabilization (IS) reduces the blurring effect caused by the motion of the device or image capturing during exposure. There is optical image stabilization (OIS) and electronic image stabilization (EIS). Optical image stabilization moves the camera in opposite direction from movement of camera device, and is a hardware-based solution. Electronic image stabilization provides software-based solution to compensate for movement of the camera. For example, the EIS unit may determine intentional and unintentional movements, and then adjust each frame with image warping. EIS may be implemented with relative ease as compared to OIS because EIS is software driven and may not be impacted from hardware failure like OIS techniques can. However, there may be loss of image quality at boundaries using EIS techniques.

Although VIO and IS techniques are separate techniques, this disclosure describes example ways in which to integrate the VIO and IS techniques. For example, rather than utilizing two separate units for VIO and IS, the example techniques iteratively update intermediate results used for both VIO and IS, resulting in efficient resource utilization. Furthermore, because the VIO and IS techniques are integrated together, the result from IS can be used to improve VIO, and vice-versa, forming a closed-loop design that results in better images and more accurate pose estimation for determination of localization (e.g., determination of where the device is relative to other objects in the image).

As described in more detail below, an integrated IS/VIO unit may be configured to utilize a tracking filter that receives as input the angular velocity and movement of the device determined from the IMU across a current frame and a subsequent frame and is configured to generate output indicative of angular velocity and movement of the device with unintentional movement of the device removed. The tracking filter may also utilize the predicted state (e.g., pose information) previously determined by a VIO unit of the IS/VIO unit to generate the output indicative of angular velocity and movement of the device with unintentional movement of the device removed.

An IS unit of the IS/VIO unit may utilize the output from the tracking filter to perform image stabilization on the current frame. The IS unit may output the image stabilized current frame to the VIO unit, and the VIO unit utilizes the image stabilized current frame to generate the predicted state. In this way, the IS unit and the VIO unit of the integrated IS/VIO unit form a closed-loop feedback design to iteratively update image stabilization and determination of pose.

As described in more detail, there may be a one-frame latency for image stabilization and determination of pose and velocity. For example, for image stabilization of a current frame, the IS unit may utilize a subsequent frame. Hence, in this disclosure, the current frame (e.g., frame n) is the frame for which image stabilization is being performed, but a subsequent frame (e.g., frame n+1) has been captured for image stabilization of the current frame. However, for the determination of pose and velocity, that determination may be for the subsequent frame (e.g., frame n+1). Accordingly, the image stabilization may be for the current frame and the pose and velocity information may be for the subsequent frame.

For instance, after the current frame, the subsequent frame becomes the current frame. Since the subsequent frame was utilized for image stabilization of the current frame, when the subsequent frame becomes the current frame, various intermediate values that were calculated are already stored within a priority queue of the integrated IS/VIO unit (e.g., predicted state and pose information for the subsequent state). Accordingly, rather than re-calculating various values, the already stored values in the priority queue can be utilized for image stabilization and pose information when the subsequent frame becomes the current frame, in addition to pose information for the next frame (e.g., frame after the current frame, where the previous subsequent frame is now the current frame).

FIG. 1 is a block diagram of a device configured to perform one or more of the example techniques described in this disclosure. Examples of camera device 10 include stand-alone digital cameras or digital video camcorders, camera-equipped wireless communication device handsets, such as mobile telephones having one or more cameras, cellular or satellite radio telephones, camera-equipped personal digital assistants (PDAs), panels or tablets, gaming devices, computer devices that include cameras, such as so-called "web-cams," or any device with digital imaging or video capabilities.

As illustrated in the example of FIG. 1, camera device 10 includes camera 12 (e.g., having an image sensor and lens), camera processor 14 and local memory 20 of camera processor 14, a central processing unit (CPU) 16, a graphical processing unit (GPU) 18, user interface 22, memory controller 24 that provides access to system memory 30, and display interface 26 that outputs signals that cause graphical data to be displayed on display 28. Although the example of FIG. 1 illustrates camera device 10 including one camera 12, in some examples, camera device 10 may include a plurality of cameras, such as for omnidirectional image or video capture.

Also, although the various components are illustrated as separate components, in some examples the components may be combined to form a system on chip (SoC). As an example, camera processor 14, CPU 16, GPU 18, and display interface 26 may be formed on a common integrated circuit (IC) chip. In some examples, one or more of camera processor 14, CPU 16, GPU 18, and display interface 26 may be in separate IC chips. Various other permutations and combinations are possible, and the techniques should not be considered limited to the example illustrated in FIG. 1.

The various components illustrated in FIG. 1 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Examples of local memory 20 and system memory 30 include one or more volatile or non-volatile memories or storage devices, such as random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 1 communicate with each other using bus 32. Bus 32 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. The specific configuration of buses and communication interfaces between the different components shown in FIG. 1 is merely exemplary, and other configurations of camera devices and/or other image processing systems with the same or different components may be used to implement the techniques of this disclosure.

Camera processor 14 is configured to receive image frames from camera 12, and process the image frames to generate output frames for display. CPU 16, GPU 18, camera processor 14, or some other circuitry may be configured to process the output frame that includes image content generated by camera processor 14 into images for display on display 28. In some examples, GPU 18 may be further configured to render graphics content on display 28.

In some examples, camera processor 14 may be configured as an image processing pipeline (sometimes called an image signal processors (ISP)). For instance, camera processor 14 may include a camera interface that interfaces between camera 12 and camera processor 14. Camera processor 14 may include additional circuitry to process the image content. Although one camera processor 14 is shown with one camera 12, in some examples, device 10 may include a plurality of cameras. Camera processor 14 may be a common camera processor for each of the cameras. In some examples, there may be a plurality of camera processors for one or more of the plurality of cameras.

Camera processor 14 outputs the resulting frames with image content (e.g., pixel values for each of the image pixels) to system memory 30 via memory controller 24. As described in more detail, CPU 16 may utilize the frames to correct for unintentional movement of camera device 10 during capturing of the frames. For instance, CPU 16 includes image stabilization (IS) and visual-inertial odometry (VIO) unit 36 (IS/VIO unit 36). IS/VIO unit 36 may utilize the frames outputted by camera processor 14 and the output from inertial measurement unit (IMU) 34 to perform image stabilization and determine pose and localization information (e.g., state) of camera device 10.

This disclosure describes the examples techniques as being performed by CPU 16 (e.g., via IS/VIO unit 36). However, the example techniques should not be considered limited to CPU 16 performing the example techniques. Moreover, IS/VIO unit 36 may be considered as software executing on the hardware of CPU 16. Accordingly, system memory 30 may store computer-readable instructions (e.g., instructions for IS/VIO unit 36) that cause one or more processors (e.g., CPU 16) to perform the example techniques described in this disclosure. The example techniques described in this disclosure are not limited to being performed by software executing on hardware. In some examples, IS/VIO unit 36 may be fixed-function circuitry configured to perform the example techniques described in this disclosure.

CPU 16 may comprise a general-purpose or a special-purpose processor that controls operation of camera device 10. A user may provide input to camera device 10 to cause CPU 16 to execute one or more software applications. The software applications that execute on CPU 16 may include, for example, a media player application, a video game application, a graphical user interface application or another program (e.g., including IS/VIO unit 36). The user may provide input to camera device via one or more input devices (not shown) such as a keyboard, a mouse, a microphone, a touch pad or another input device that is coupled to camera device 10 via user interface 22.

One example of the software application is a camera application. CPU 16 executes the camera application, and in response, the camera application causes CPU 16 to generate content that display 28 outputs. GPU 18 may be configured to process the content generated by CPU 16 for rendering on display 28. For instance, display 28 may output information such as light intensity, whether flash is enabled, and other such information. The user of camera device 10 may interface with display 28 to configure the manner in which the images are generated (e.g., with or without flash, focus settings, exposure settings, and other parameters). The camera application also causes CPU 16 to instruct camera processor 14 to capture and process the frames of image content captured by camera 12 in the user-defined manner.

Memory controller 24 facilitates the transfer of data going into and out of system memory 30. For example, memory controller 24 may receive memory read and write commands, and service such commands with respect to memory 30 in order to provide memory services for the components in camera device 10. Memory controller 24 is communicatively coupled to system memory 30. Although memory controller 24 is illustrated in the example of camera device 10 of FIG. 1 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor 14, CPU 16, and GPU 18. For example, system memory 30 may store user applications (e.g., instructions for the camera application), resulting frames from camera processor 14, etc. As another example, as described above, system memory 30 may store the instructions for IS/VIO unit 36 so that IS/VIO unit 36 executes on CPU 16. System memory 30 may additionally store information for use by and/or generated by other components of camera device 10. For example, system memory 30 may act as a device memory for camera processor 14.

Camera processor 14, CPU 16, and GPU 18 may store image data, and the like in respective buffers that are allocated within system memory 30. Display interface 26 may retrieve the data from system memory 30 and configure display 28 to display the image represented by the generated image data. For example, display 28 may output the output frame generated by camera processor 14. In some examples, display interface 26 may include a digital-to-analog converter (DAC) that is configured to convert the digital values retrieved from system memory 30 into an analog signal consumable by display 28 to drive elements of the displays. In other examples, display interface 26 may pass the digital values directly to display 28 for processing.

Display 28 may include a monitor, a television, a projection device, a liquid crystal display (LCD), a plasma display panel, a light emitting diode (LED) array, or another type of display unit. Display 28 may be integrated within camera device 10. For instance, display 28 may be a screen of a mobile telephone handset or a tablet computer. Alternatively, display 28 may be a stand-alone device coupled to camera device 10 via a wired or wireless communications link. For instance, display 28 may be a computer monitor or flat panel display connected to a personal computer via a cable or wireless link.

As illustrated, camera device 10 includes inertial measurement unit (IMU) 34. In one or more examples, IMU 34 is a six-axis IMU. The six-axis IMU may couple a 3-axis accelerometer with a 3-axis gyroscope. Accelerometers measure linear acceleration, while gyroscopes measure rotational motion. For example, the accelerometer of IMU 34 may indicate the movement of camera device 10 in 3-axis (x, y, z coordinates) and the gyroscope of IMU 34 may indicate the angular velocity of camera device 10 in 3-axis (x, y, z coordinates).

As described above, camera device 10 may output, for display (e.g., via display 28), frames captured by camera 12. However, in some examples, due to movement of camera device 10 (e.g., shaking from the user holding camera device 10 or some other unintentional movement), the image content in the frames displayed on display 28 may be blurry, which negatively impacts viewer experience.

Moreover, in some examples, camera device 10 may be configured to generate information indicative of its position and orientation (pose) and velocity based on the frames captured by camera 12. An example technique for determining the pose and velocity of camera device 10, as well as a prediction of where camera device 10 will be is referred to as visual-inertial odometry (VIO) techniques.

For example, for virtual reality (VR)/augmented reality (AR), the pose of camera device 10, as well as locations of objects captured in the frames, may be utilized to generate the VR/AR experience (e.g., localization of camera device 10 relative to other objects). If the pose information of camera device 10 is based on blurry images, the resulting localization by the VIO techniques may be erroneous, causing negative viewer experience. There may be other reasons for utilizing VIO, and VR/AR is one example.

This disclosure describes example techniques to integrate image stabilization (IS) and VIO into IS/VIO unit 36 to generate image stabilized frames with reduced blurriness and provide more accurate pose and velocity information. For instance, IS/VIO unit 36 includes an IS unit and a VIO unit, as described in more detail with respect to FIG. 2. However, the IS unit and the VIO unit of IS/VIO unit 36 share input and outputs, so that any intermediate values that are generated can be iteratively updated in a manner which resources used for image stabilization and visual-inertial odometry can be shared. As one example, the output from IS unit of IS/VIO unit 36 is used as input to the VIO unit of IS/VIO unit 36, and the output of the VIO unit of IS/VIO unit 36 is feedback input for the IS unit of IS/VIO unit 36, forming a closed-loop design. Also, intermediate values generated, as part of image stabilization or visual-inertial odometry, may be stored in a priority queue in a manner in which the same data can be reused rather than being recalculated.

As one example, IS/VIO unit 36 may receive a first set of information, the first set of information being indicative of angular velocity and movement of camera device based on change in position of camera device 10 across a current frame and a subsequent frame. In this disclosure, there may be a one frame (or possibly one or more frame) latency in image stabilization. For example, to perform image stabilization for a current frame (e.g., frame n), IS/VIO unit 36 utilizes a subsequent frame (e.g., frame n+1), where camera device 10 captures the subsequent frame after capturing the current frame. Hence, the example techniques are described with respect to stabilization with respect to a current frame, but the current frame may not be the most recently captured frame. Rather, to perform stabilization a subsequent frame (e.g., a frame captured after the current frame, and in some examples, the immediately next frame) is utilized by IS/VIO unit 36 for stabilization.

However, for determining the pose and velocity information, IS/VIO unit 36 may determine such pose and velocity information for camera device 10 for the subsequent frame (e.g., frame n+1). Accordingly, the image stabilization may be for frame n, but the pose and velocity information may be determined from frame n+1.

For example, IMU 34 may output angular velocity (w) and movement information (e.g., acceleration represented by "a"). The angular velocity may be the angular velocity of camera device 10 between when camera device 10 captured a current frame and a subsequent frame. The movement information may be the movement of camera device 10 between when camera device 10 captured the current frame and the subsequent frame. In some examples, one or more filters (e.g., random noise filters) may filter the angular velocity and movement information.

IS/VIO unit 36 may filter the first set of information to compensate for unintentional movement of camera device 10 to generate a second set of information, the second set of information being indicative of angular velocity and movement of camera device 10 without unintentional movement. For example, during capturing of frames for a video, the user of camera device 10 may intentionally move camera device (e.g., to track movement of an object, to pan across a scene, etc.). During this intentional movement of camera device 10, there may be an unintentional movement component, where camera device 10 moves due to slight involuntary shaking by the user. In some examples, the involuntary shaking by the user may also occur between capturing the current frame and the subsequent frame even when the user is not intentionally moving camera device 10.

The unintentional movement of the user may be relatively slight. For instance, arm fatigue may make it difficult for the user to hold the camera steady. Slight shifts in the position of user, such as rebalancing, shifting for comfort, etc. can also result in unintentional movement of camera device 10. Such unintentional movement can result in blurry images and poor pose and localization determination as described above.

There may be various ways in which to filter the first set of information to compensate for the unintentional movement of camera device 10 to generate the second set of information. As one example, IS/VIO unit 36 may utilize extended Kalman filters (EKFs) to model motions and utilize probability information to determine whether movement was intentional or unintentional. In addition, to perform the filtering, the IS/VIO unit 36 may utilize previously determined position and orientation of camera device 10 (e.g., from the VIO unit of IS/VIO unit 36) and previously generated information (e.g., generated for frames prior to the current frame) of angular velocity and movement of camera device 10 without unintentional movement as inputs to the EKFs. The result from the filtering may be the second set of information, where the second set of information is indicative of angular velocity and movement of camera device 10 without unintentional movement.

IS/VIO unit 36 may perform image stabilization on the current frame based on both the first set of information and the second set of information to generate an image stabilized current frame. As described above, the first set of information is indicative of angular velocity and movement of camera device 10 based on change in position of camera device 10 across the current frame and the subsequent frame. The second set of information is indicative of angular velocity and movement of camera device 10 without unintentional movement of camera device 10. In one or more examples, for image stabilization, IS/VIO unit 36 utilize both the first set of information and the second set of information for adjusting the location of a region in the current frame, such that the adjusted location of the current frame compensates for the unintentional movement of camera device 10.

For example, the location of a region in the current frame may be incorrect and due to the unintentional movement of camera device 10. IS/VIO unit 36 may utilize the first set of information and the second set of information to adjust the location of the region such that in the image stabilized current frame the location of the region is correct and the blurriness cause by unintentional movement of camera device 10 is minimized.

IS/VIO unit 36 may output, for display on display 28, the image stabilized current frame. Also, the VIO unit of IS/VIO unit 36 may determine position and orientation (pose) of camera device 10 based on the image stabilized current frame. IS/VIO unit 36 may then output information indicative of the determined position and orientation, which may be utilized by GPU 18 or other components for AR/VR. Because the image stabilized current frame has reduced blurriness, there may be greater accuracy in the determined position and orientation of camera device 10.

Figure 2:
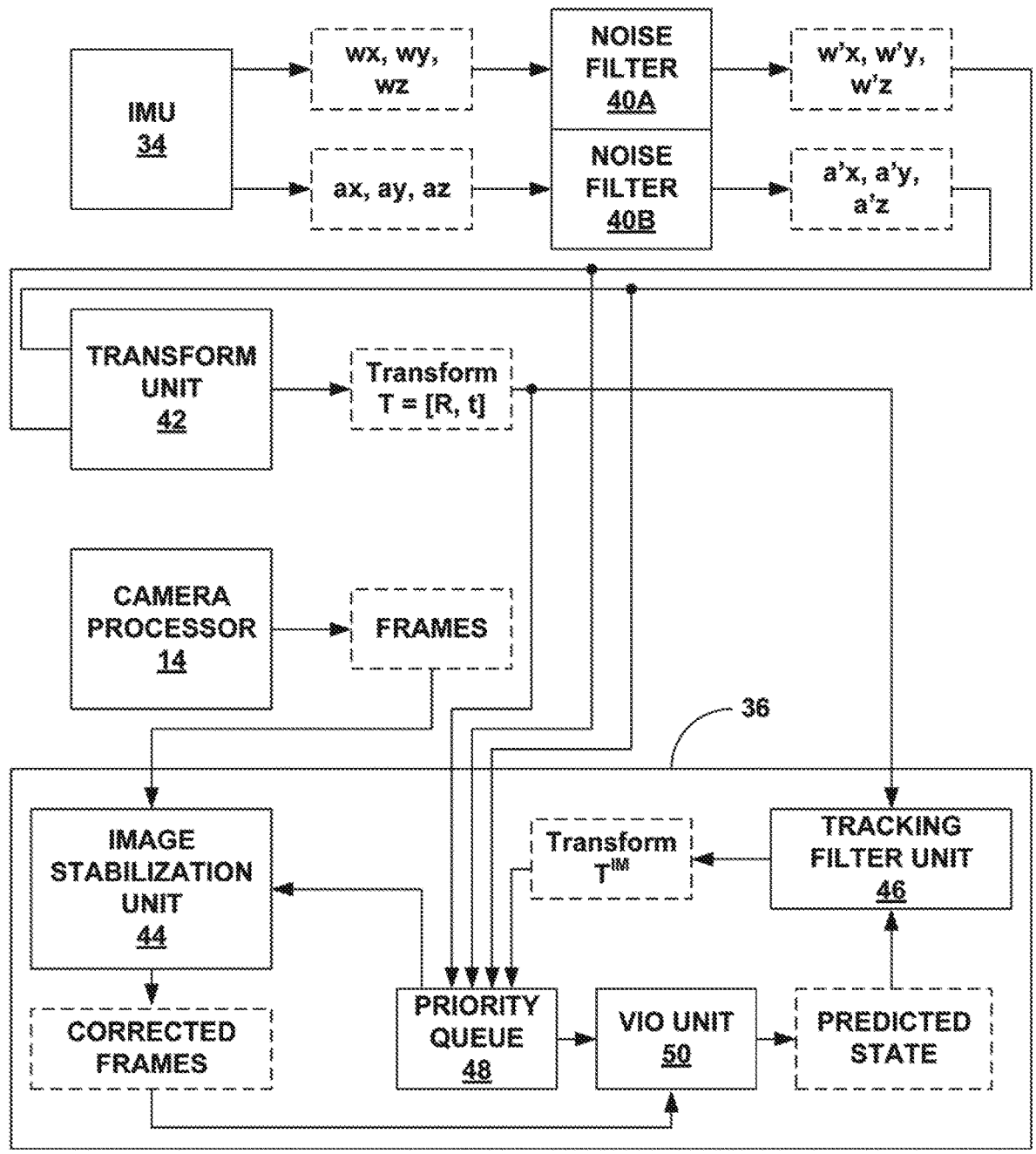
FIG. 2 is a block diagram illustrating an example of an image stabilization and visual-inertial odometry (VIO) unit of FIG. 1 in further detail.

FIG. 2 is a block diagram illustrating an example of an image stabilization and visual-inertial odometry (VIO) unit 36 of FIG. 1 in further detail. In FIG. 2, the dashed boxes illustrate the output from a unit. For example, as illustrated in FIG. 2, IMU 34 outputs the angular velocity and movement of camera device 10 across a current frame and a subsequent frame. The angular velocity may be represented in three-dimensions as wx, wy, and wz, and the movement may be represented in three-dimensions as ax, ay, and az.

In one or more examples, noise filter 40A may noise filter the angular velocity, and noise filter 40B may filter the movement information. Noise filter 40A and noise filter 40B may be digital filters formed using a digital signal processor (DSP). For example, camera device 10 may include a DSP and noise filter 40A and noise filter 40B may be formed on the DSP. As another example, noise filter 40A and noise filter 40B may be formed within CPU 16. The output from noise filter 40A is w'x, w'y, and w'z, and the output from noise filter 40B is a'x, a'y, and a'z.

In some examples, IMU 34 may suffer from random noise in the measurement, and noise filter 40A and noise filter 40B may be configured to filter out such random noise. The random noise that is added by IMU 34 tends to be low frequency below cutoff frequency or high frequency above cutoff frequency, and therefore, noise filter and noise filter 40B may be averaging filters to filter out the random noise beyond bandwidth. As one example, the averaging filter for noise filter 40A and noise filter can be represented as follows: $y_i=(1-\alpha)y_{i-1}+\alpha(x_i-x_{i-1})$. In this example, $x_i$ is the input and $y_i$ is the output signal at time step i, $x_{i-1}$ is the input at time step i−1, and $\alpha$ is a time constant that may be set as follows: $\alpha=\tau/(\tau+dt)$. In one or more examples, $\tau$ can be user selected value used in designing noise filter 40A and noise filter 40B according to slope rate of output/input.

In one or more examples, the angular velocity (e.g., w'x, w'y, and w'z) may be considered as the rotation of camera device 10 and the movement (e.g., a'x, a'y, and a'z) may be considered as the translation vector of camera device 10 across the current frame and the subsequent frame. In one or more examples, transform unit 42 may utilize the rotation and translation to form a unified matrix that includes the angular velocity and movement information in a formulation that eases filtering to compensate for unintentional movement of camera device 10. Transform unit 42 may be hardware unit or software unit executing on CPU 16.

As illustrated, transform unit 42 generates transformation matrix T which includes the rotation (R) and translation (t). Accordingly, the output from transform unit 42 is shown as transform T=[R, t]. In one or more examples, transform T may be in the Lie group formulation. In mathematics, a Lie group is a group, whose elements are organized continuously in a smooth way in a matrix. The matrix may be differentiable in an exponential manifold space, and has closed form. Euler angles (roll, pitch, yaw) that are indicative of angular velocity may suffer from matrix rank degeneration when "gimbal lock" problem exists. Accordingly, it may be possible to transform such angular velocity and movement into a group of n×n invertible matrices with a Lie group, where the element of the matrix is exp(tX), by using the matrix exponential, t is in vector space $R_n$, X is the (n×n) matrices over complex field $C_m$.

The following describes one example way in which transform unit 42 may generate transformation matrix T. During manufacturing and prior to use of camera device 10, the manufacturer (or possibly some other entity but for ease is described with the manufacturer) may perform cross-calibration between IMU 34 and camera 12. The manufacturer may face camera 12 towards a chessboard pattern having unit "April tag patterns" with known scale. The manufacturer may then move camera device 10 in the following order: roll, pitch, yaw, back and forth, left and right, and top and down. Each of these steps may be repeated several times to collect both the output from camera 12 and IMU 34. From the collected information, it may be possible to determine the camera orientation (Rwc) and the IMU orientation (Rwi) in the world frame. The relative rotation between camera device 10 and IMU 34 may then be acquired as Rwi/Rwc. Transform unit 42 may utilize the Rwc for two consecutive frames (e.g., current frame and subsequent frame) to generate the transformation matrix T.

As described above, the transformation matrix T between two consecutive frames (e.g., current frame and subsequent frame) include the relative rotation matrix (e.g., w'x, w'y, and w'z), represented as R, and the translation vector (e.g., a'x, a'y, and a'z), represented as t. The transformation matrix T may be represented as:

$$T_{10} = \begin{bmatrix} R_{10} & t_{10} \\ 0 & 1 \end{bmatrix}$$

In the above equation, T10 represents the transformation matrix T across a current frame and a subsequent frame. R10 represents the rotation across the current frame and the subsequent frame, and t10 represent the translation across the current frame and the subsequent frame.

For instance, R10 is a function of the gyroscope angular velocity measurements of IMU 34 and the bias of the gyroscope. The following relation between a current frame (frame 1) and subsequent frame (frame 0) may be:

$$R10 = Rw1^{-1}Rw0.$$

Rw0 may be acquired by the discrete integration of angular velocities in world frame until the time step moving to the subsequent frame (frame 0). Rw0 may be dependent on the gyroscope angular velocity bias as well. Each integration step is:

$$Rw_{n+1} = e^{\wedge}(Rwn[w+bg]dt)Rwn.$$

Rwn represents the integrated rotation matrix from the world frame to the coordinate frame at time n.

For the translation vector t10, t10 can be related to the world coordinate frame as follows:

$$t10 = tw0 - tw1.$$

The discrete integration at each time step is:

$$tw_{n+1} = tw_n + \int_n^{n+1} vn\, dt$$

$$v_n = v_{n+1} \int_n^{n+1}(Rwn[a+ba]-g)dt$$

The equation for t10 can be simplified to $$t_{10} = \Delta tv_1 + \tfrac{1}{2}\Delta t^2 g + t^*_{10}$$

In the above equation, $t^*_{10}$ is the integration part of the twn+1 and vn, but with the start velocity and gravity vector set to zero. Also, the rotation matrix may be independent of the translation vector. Accordingly, the transformation matrix T that is output from transform unit 42 may be as follows. In the following description, the transformation matrix T may be considered equivalent to the T10 in the following equation.

$$T_{10} = \begin{bmatrix} I_{3\times 3} & \Delta tv_1 + \tfrac{1}{2}\Delta t^2 g \\ 0_{1\times 3} & 1 \end{bmatrix} \begin{bmatrix} R_{10} & t^*_{10} \\ 0_{1\times 3} & 1 \end{bmatrix}$$

In this manner, transform unit 42 may generate the transformation matrix T that is used for filtering out the angular velocity and movement information caused by unintentional movement of camera device 10. For example, as illustrated in FIG. 2, IMU data (e.g., angular velocity and movement information from IMU 34) is processed by an averaging filter to remove random noise (e.g., filtered by noise filter 40A and noise filter 40B). Transform unit 42 may then integrate the filtered angular velocity (e.g., w'x, w'y, and w'z) and acceleration (e.g., a'x, a'y, and a'z) into pose transformation with the Lie Group formulation (e.g., to generate transformation matrix T). For instance, transformation matrix T is a unified matrix that includes the integrated filtered angular velocity and acceleration information. Transformation matrix T may be considered as a first set of information, the first set of information being indicative of angular velocity and movement of camera device 10 based on change in position of camera device across a current frame and a subsequent frame.

As illustrated in FIG. 2, IS/VIO unit 36 may receive the first set of information (e.g., transformation matrix T). IS/VIO unit 36 may also receive one or more frames (e.g., current frame and subsequent frame), where IS/VIO unit 36 may perform image stabilization on the current frame to remove the blurriness in the current frame, and well as more accurately determine pose and localization based on the current frame. IS/VIO unit 36 may receive the one or more frames continuously (e.g., in preview mode) at a particular frame rate, or may receive the one or more frames when instructed (e.g., like in a snapshot).

IS/VIO unit 36 may include image stabilization unit 44, tracking filter unit 46, priority queue 48, and visual-inertial odometry (VIO) unit 50. In some examples, priority queue 48 may be part of system memory 30. In some examples, priority queue 48 may be part of local memory of CPU 16 (e.g., cache memory, registers, etc. of CPU 16).

Tracking filter unit 46 may receive the first set of information (e.g., transformation matrix T) and filter the first set of information to compensate for unintentional movement of camera device 10 to generate a second set of information, the second set of information begin indicative of angular velocity and movement of camera device 10 without unintentional movement. As illustrated, tracking filter unit 46 may output transform $T^{IM}$, where transform $T^{IM}$ is a filtered state without unintentional movement of camera device 10. As example manner in which tracking filter unit 46 may generate $T^{IM}$ is described in more detail with respect to FIG. 3.

In general, as illustrated in FIG. 2, tracking filter unit 46 receives as input a previously predicted state (e.g., position and orientation previously determined for a frame prior to the current frame) that was generated by VIO unit 50. Tracking filter unit 46 also receives the transformation matrix T, which includes the current angular velocity and movement information from IMU 34. Tracking filter unit 46 mixes previously predicted state and the transformation matrix T, and applies filtering to the result of the mixing to decompose the transformation matrix T into two parts: a decomposed first part of the transformation and a decomposed second part of the transformation. The decomposed second part of the transformation may be the unintentional movement information. The decomposed first part of the transformation may be the angular velocity and movement information with the unintentional movement removed (e.g., with the decomposed second part of the transformation removed). The decomposed first part of the transformation is referred to as transformation matrix $T^{IM}$.

Priority queue 48 may store both the transformation matrix T (e.g., the first set of information) and transformation matrix $T^{IM}$ (e.g., the second set of information). Image stabilization unit 44 may receive both the first of information (e.g., transformation matrix T) and the second set of information (e.g., transformation matrix $T^{IM}$) and perform image stabilization to generate an image stabilized current frame (illustrated as corrected frames in FIG. 2). Example techniques to perform image stabilization to generate the image stabilized current frame is described below with respect to FIGS. 4A and 4B.

VIO unit 50 may be configured to receive corrected frames (e.g., image stabilized current frame) as well as current, filtered IMU measurements (e.g., w'x, w'y, w'z, a'x, a'y, and a'z). VIO unit 50 may utilize the received information to determine the pose (e.g., position and orientation) and velocity of camera device 10. The predicted state (e.g., pose and velocity) that VIO unit 50 outputs is an example of the pose an velocity information that VIO unit 50 generates. As illustrated, the predicted state information is fed into tracking filter unit 46 for generation of transformation matrix $T^{IM}$, which is then used for image stabilization by image stabilization unit 44. In this way, image stabilization unit 44 and VIO unit 50 form a closed loop design, where values generated by one are fed back to the other.

To determine pose (e.g., position and orientation) information for camera device 10, VIO unit 50 may perform pre-integration on the angular velocity and movement information and feature detection in the image stabilized current frame received from image stabilization unit 44. In some examples, the pre-integration on the angular velocity and movement information may be pre-integration on the angular velocity and movement information without the unintentional movement. That is, VIO unit 50 may perform pre-integration on transformation matrix $T^{IM}$ As described above, transformation matrix $T^{IM}$ represents the information indicative of angular velocity and movement of camera device 10 without unintentional movement. Accordingly, VIO unit 50 may reuse the transformation matrix $T^{IM}$ that is used by image stabilization unit 44 but for pre-integration.

VIO unit 50 may estimate pose and velocity through discrete sum of angular velocity and acceleration multiplied by time interval. Double integral of acceleration over time interval is the position estimation. In this integration process, biases of the acceleration and gyroscope measurements are also updated and subtracted from the raw measurements.

VIO unit 50 may also detect features in image stabilized current frame and the subsequent frame. These visual features are salient points compared to neighboring pixels in visual appearance, and a descriptor for each feature point will also be extracted by statistical results of patch around feature point. These distinctive feature points across consecutive image frames (e.g., the current frame and the subsequent frame) are utilized to establish the correspondence between frames for tracking. In some examples, VIO unit 50 may utilize a sliding-window of frames for optimization purposes. For example, 5-10 frames, with rich feature points, may be maintained for use by VIO unit 50 to determine pose information. With the output from the sliding-window optimization, VIO unit 50 may perform localization and generate the pose information for camera device 10, and also a global map of 3D points surrounding camera device 10 captured in the subsequent frame using the image stabilized frames.

The relative pose of two frames is estimated firstly by pre-integration of IMU measurements, then further optimized by feature tracking given the 2D feature point correspondences between two frames. The optimizing is to minimize the summed reprojection errors between predicted pixel and observed pixel locations. The 3D map points are firstly triangulated by 2D correspondence of feature points in camera frame, then registered into global frame by camera to map transform.

Figure 3:
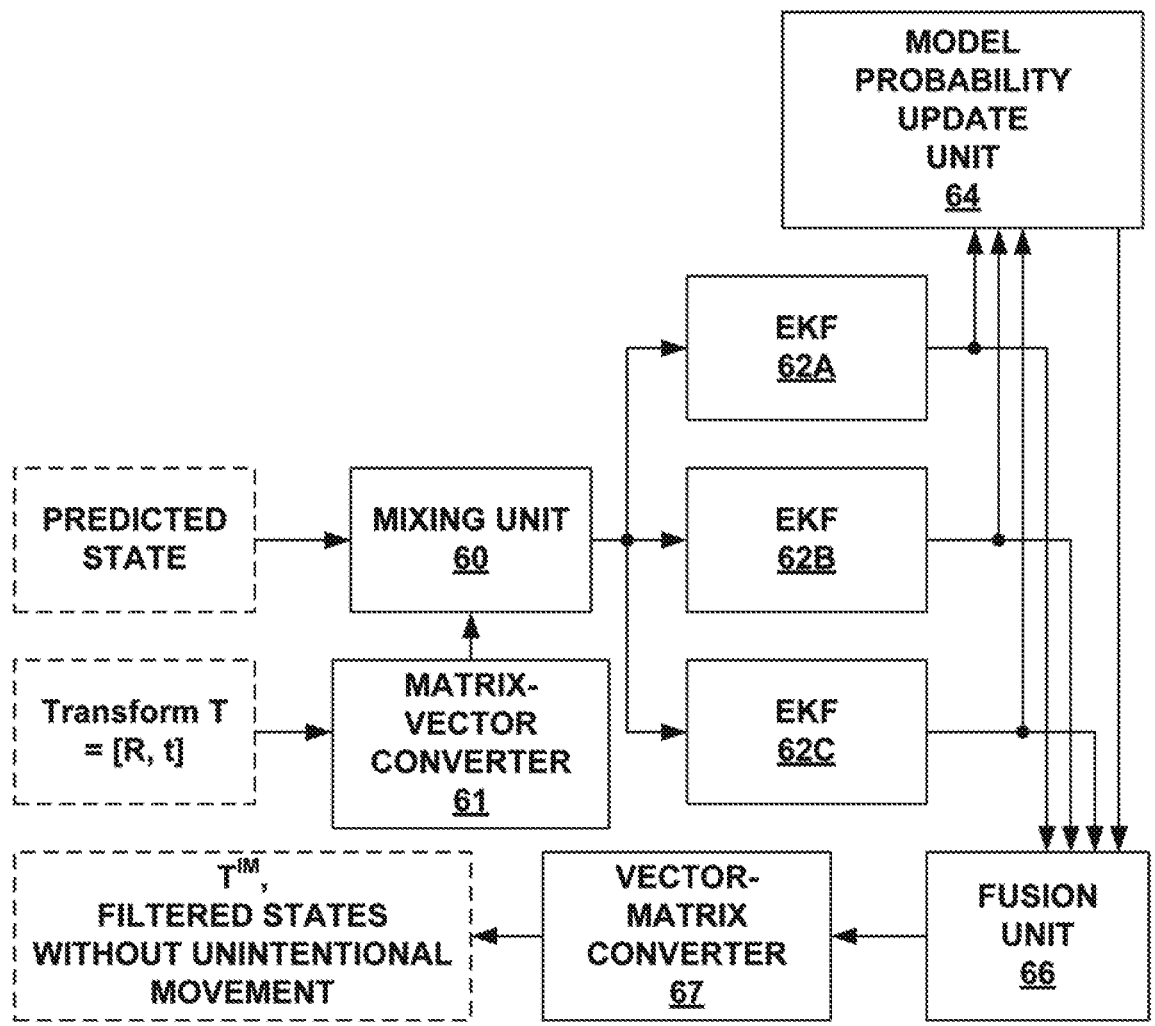
FIG. 3 is a block diagram illustrating an example of a tracking filter unit of FIG. 2 in further detail.

FIG. 3 is a block diagram illustrating an example of a tracking filter unit of FIG. 2 in further detail. As illustrated, tracking filter unit 46 includes mixing unit 60, matrix-vector converter 61, one or more extended Kalman filters (EKFs) 62A-62C, model probability update unit 64, fusion unit 66, and vector-matrix converter 67. Mixing unit 60 may receive, as input, the first set of information (e.g., transformation matrix T) and information indicative of previously determined position and orientation of camera device 10 (e.g., predicted state). In some examples, matrix-vector converter 61 may convert the Lie group transformation matrix T (e.g., the first set of information) to a vector utilizing the logarithm operation (e.g., log X). Conversion to matrix may be performed for calculation purposes and should not be considered as limiting.

The previously determined position and orientation of camera device 10 may have been previously determined by VIO unit 50. As described above, the first set of information (e.g., transformation matrix T) is indicative of angular velocity and movement of camera device 10 based on a change in position of the device across a current frame captured by camera device 10 and a subsequent frame captured by camera device 10.

Mixing unit 60 may mix the received information indicative of previously determined position and orientation of camera device 10 and the first set of information (e.g., transformation matrix T) to generate a mixed estimate of angular velocity and movement of camera device 10. The mixed estimate of angular velocity and movement may be equal to $((P^{-1}*\text{predicted state})+Q^{-1}*(\text{transformation matrix T}))/(P^{-1}+Q^{-1})$, where P and Q are the respective covariance matrix of the predicted state and transformation matrix T, respectively.

EKFs 62A-62C may each receive the mixed estimate from mixing unit 60. EKFs 62A-62C may be each configured to model different dynamics and kinematics of camera device 10. For example, EKF 62A may be configured to model constant velocity. EKF 62B may be configured to model constant angular velocity. EKF 62C may be configured to model constant acceleration. EKFs 62A-62C may together model any intentional motion of camera device 10 to generate modeled motions indicative of intentional movement of camera device 10. That is, any motion in reality can be represented by a combination of the motion models from EKFs 62A-62C. Any other un-modeled motion patterns may be considered as unintentional movement (e.g., unintentional vibration).

For example, EKFs 62A-62C may determine which portions of the angular velocity and movement from the mixing estimate from mixing unit 60 aligns with respective models of EKFs 62A-62C. The modeled motion may be the motion that aligns with the respective models of EKFs 62A-62C. Any portions of angular velocity and movement of the mixing estimate from mixing unit 60 that does not align with the respective models of EKFs 62A-62C may represent unintentional movement of camera device 10. Accordingly, tracking filter unit 46 may apply one or more extended Kalman filters (EKFs) 62A-62C to the mixed estimate to generate one or more modeled motions. The modeled motions may be indicative of intentional movement of camera device 10.

Model probability update unit 64 may determine model probabilities of the one or more modeled motions. Each model probability $P_i$ matrix from paralleling EKFs 62A-62C may be calculated according to each state covariance matrix $Q^i$ over a sum of covariance matrices of all models of EKFs 62A-62C: $P_i = Q_i^{-1}/\Sigma_{i=1}^{i=n} Q_i^{-1}$. The variable P is reused here as $P_i$, but $P_i$ is different than variable P used above for mixing unit 60.

Fusion unit 66 may fuse the model probabilities and the one or more modeled motions to generate $T^{IM}$, where $T^{IM}$ is information indicative of angular velocity and movement of camera device 10 without unintentional movement. In some examples, the output from fusion unit 66 may be a vector that vector-matrix converter 67 converts to a matrix (e.g., using the exponential operation $e^X$). If transformation matrix T is a first set of information indicative of angular velocity and movement of camera device based on change in position of camera device 10 across a current frame and a subsequent frame, then transformation matrix $T^{IM}$ is a second set of information indicative of angular velocity and movement of camera device 10 without unintentional movement.

Fusion unit 66 may perform the fusing operation by a weighted sum of the outputs from each of EKFs 62A-62C and respective model probabilities determined by model probability update unit 64. For example, fusion unit 66 may determine $X_t = \Sigma_{i=1}^{i=n} P_i X_i$. In this example, $X_i$ is the output from each of EKFs 62A-62C and $P_i$ is the respective probability from model probability update unit 64. $X_t$ represents $T^{IM}$, but in vector form that is converted into the matrix $T^{IM}$ with vector-matrix converter 67.

Image stabilization unit 44 may utilize the transformation matrix T and the transformation matrix $T^{IM}$ to perform image stabilization. As one example, image stabilization unit 44 may determine the following:

$$[u0', v0', 1]^T = A(T)^{-1} T^{IM} A^{-1} [u0, v0, 1]^T.$$

In the above equation, [u0, v0, 1] is coordinate of a region in the current frame prior to image stabilization. For example, u0 represents width and v0 represents height. [u0', v0', 1] is coordinate of the region in the image stabilized current frame. As above, u0' represents width and v0' represents height. "A" is the intrinsic matrix. As described above, transformation matrix T is a first set of information indicative of angular velocity and movement of camera device 10 based on change in position of camera device 10 across a current frame and a subsequent frame, and transformation matrix $T^{IM}$ is a second set of information indicative of angular velocity and movement of camera device 10 without unintentional movement. Transform unit 42 may generate transformation matrix T, and tracking filter unit 46 may generate transformation matrix $T^{IM}$ The superscript T is used to represent the "transpose" and should not be confused with the transformation matrix T.

Figure 4A:
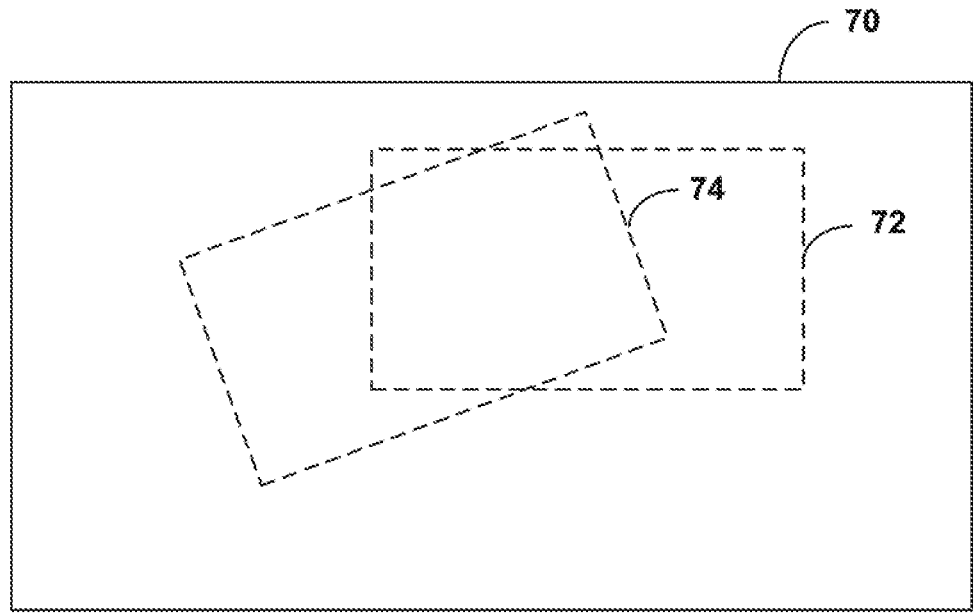
FIGS. 4A and 4B are conceptual diagrams illustrating an example way in which image stabilization is performed in accordance with one or more example techniques described in this disclosure.
Figure 4B:
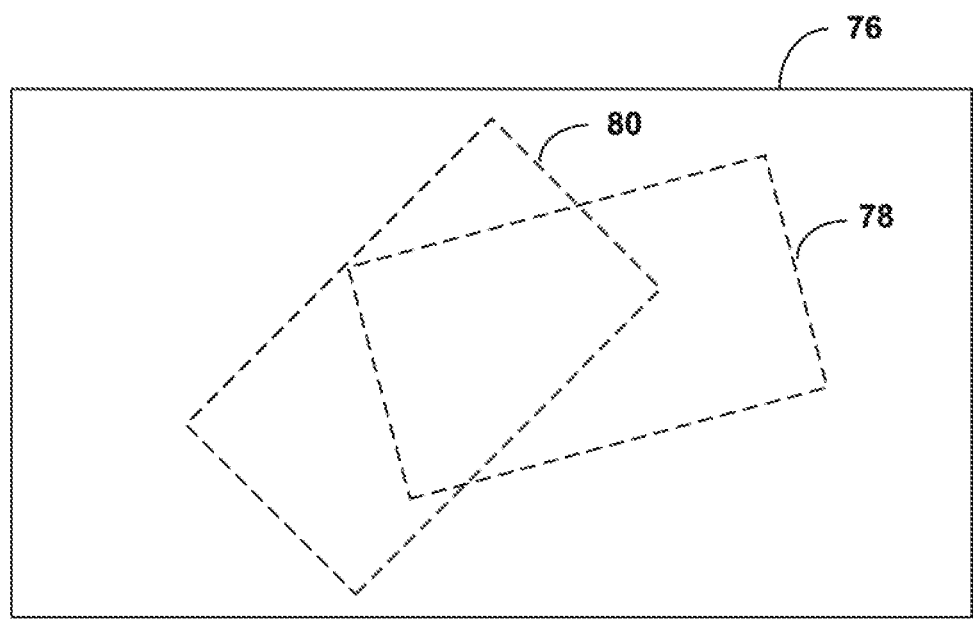

The following describes with respect to FIGS. 4A and 4B the manner in which to compute that $[u0', v0', 1] = A*(T)^{-1} *T^{IM} *A^{-1} [u0, v0, 1]^T$ provides image stabilization by compensating for unintentional movement. Image stabilization unit 44 may not need to perform the following equations each time. Rather, image stabilization unit 44 may be pre-configured to perform operations in accordance with $[u0', v0', 1]^T = A*(T)^{-1} *T^{IM} *A^{-1} [u0, v0, 1]^T$, and the following is to ease with understanding.

FIGS. 4A and 4B are conceptual diagrams illustrating an example way in which image stabilization is performed in accordance with one or more example techniques described in this disclosure. FIG. 4A illustrates current frame 70 having current region 72, where region 72 is a region in current frame 70 prior to image stabilization. FIG. 4B illustrates subsequent frame 76 having region 78. Subsequent frame 76 may be the frame captured by camera 12 after camera 12 captures current frame 70. In some examples, subsequent frame 76 is consecutively after current frame 70 in capture. As described in more detail, image stabilization unit 44 may utilize image stabilization to rotate current region 72 to image stabilized region 74.

In the example of FIGS. 4A and 4B, the coordinates for region 78 may be as follows:

$Zc1[u1, v1, 1]^T = A*T*A^{-1} *Z0[u0, v0, 1]^T$, where [u1, v1, 1] represent coordinates for region 78 and [u0, v0, 1] represent coordinates of current region 72, A is the intrinsic matrix, and T is the transformation matrix T.

As described above, transformation matrix T may include a decomposed first part of the transformation and a decomposed second part of the transformation. The decomposed second part of the transformation may be the unintentional movement information. The decomposed first part of the transformation may be the angular velocity and movement information with the unintentional movement removed (e.g., with the decomposed second part of the transformation removed). The decomposed first part of the transformation is referred to as transformation matrix $T^{IM}$. The decomposed second part of the transformation is referred to as transformation matrix T.

The above equation for Zc1 can be rewritten with $T^{IM}$ and $T^{NM}$ as follows:

$$Zc1[u1, v1, 1]^T = A*T^{NM}*T^{IM}*A^{-1}*Z0[u0, v0, 1]^T.$$

By moving $T^{NM}$ from the right side to the left side of the equation, the above equation can be rewritten as:

$$A*(T^{NM})^{-1}*A^{-1}*Zc1[u1, v1, 1]^T = A*T^{IM}*A^{-1}*Z0[u0, v0, 1]^T.$$

The left side of the above equation may be considered as the coordinates of region 80 in subsequent frame 76. For instance, the above equation can be rewritten as:

$Zc1[u1', v1', 1]^T = A*T^{IM}*A^{-1}*Z0[u0, v0, 1]^T$, where [u1', v1', 1] is the coordinates for region 80 in subsequent frame 76.

Because the equation for $Zc1[u1, v1, 1]^T$ is $A*T^{NM}*T^{IM}*A^{-1}*Z0[u0, v0, 1]^T$ the equation for $Zc1[u1', v1', 1]^T$ can also be written as follows $A*T^{NM}*T^{IM}*A^{-1}*Z0[u0', v0', 1]_T$. In this equation, [u0', v0', 1] are the coordinates for region 74 in current frame 70.

By combining the two equations for $Zc1[u1', v1', 1]^T$, the result is:

$$A*T^{NM}*T^{IM}*A^{-1}*Z0[u0', v0', 1]^T = A*T^{IM}*A^{-1}*Z0[u0, v0, 1]^T.$$

The above equation can be simplified to:

$$[u0', v0', 1]^T = A*(T)^{-1}*T^{IM}*A^{-1}*[u0, v0, 1]^T.$$

Image stabilization unit 44 may perform the operations of the following equation: $[u0', v0', 1]^T = A*(T)^{-1}*T^{IM}*A^{-1}*[u0, v0, 1]^T$ on current frame 70 to generate the image stabilized current frame. In some examples, rather than u0, v0 representing height and width of a region, u0 and v0 may represent coordinate of a pixel in current frame 70. Image stabilization unit 44 may perform the operation of $[u0', v0', 1]^T = A*(T)^{-1}*T^{IM}*A^{-1}[u0, v0, 1]^T$ on a pixel-by-pixel basis to generate the image stabilized current frame. The equation $A*(T)^{-1}*T^{IM}*A^{-1}[u0, v0, 1]^T$ includes both transformation matrix T and transformation matrix $T^{IM}$. Accordingly, image stabilization unit 44 may perform image stabilization on current frame 70 based on both the first set of information (e.g., transformation matrix T) and the second set of information (e.g., transformation matrix $T^{IM}$) to generate an image stabilized current frame.

Figure 5:
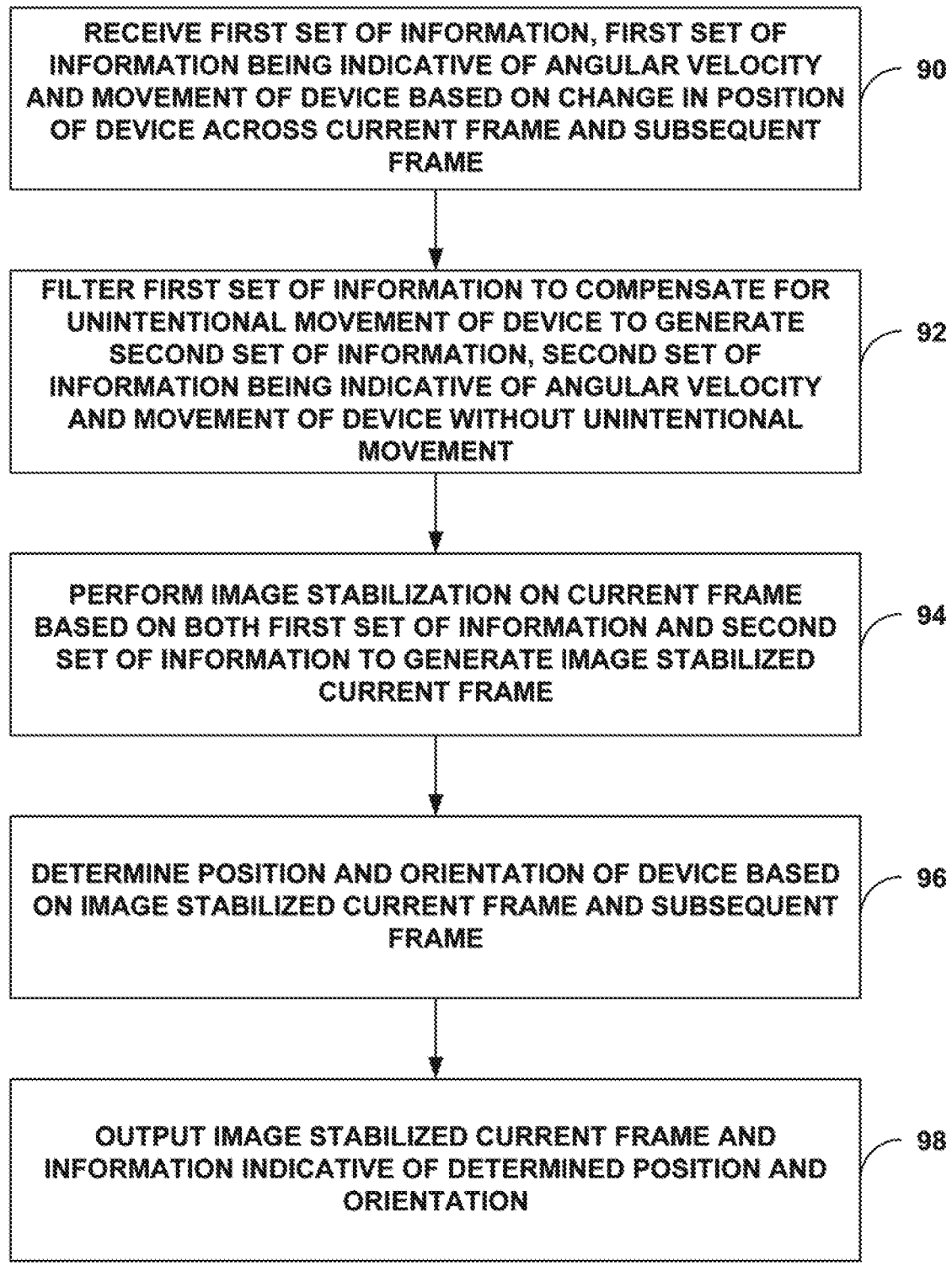
FIG. 5 is a flowchart illustrating an example method of operation in accordance with one or more examples described in this disclosure.

FIG. 5 is a flowchart illustrating an example method of operation in accordance with one or more examples described in this disclosure. For ease of description, the example is described with respect to IS/VIO unit 36 in FIG. 2 and tracking filter 46 of IS/VIO unit 36 in FIG. 3.

Tracking filter 46 of IS/VIO unit 36 may receive a first set of information, the first set of information being indicative of angular velocity and movement of the device based on a change in position of the device across a current frame captured by camera device 10 and a subsequent frame captured by camera device 10 (90). For example, tracking filter 46 may receive transformation matrix T from transform unit 42. As described above, transformation matrix T may be a unified transform matrix with information indicative of angular velocity and movement of the device integrated into the unified transform matrix.

In some examples, transform unit 42 may receive angular velocity and movement of camera device 10 in Euclidean space. The angular velocity and movement of camera device 10 information may be from IMU 34 and filtered by noise filters 40A and 40B. Transform unit 42 may transform, with a Lie Group transform, the angular velocity and movement of camera device 10 in Euclidean space to exponential manifold space to generate the first set of information. For instance, as described above, transform unit 42 may determine:

$$T_{10} = \begin{bmatrix} I_{3*3} & \Delta t v_1 + \frac{1}{2}\Delta t^2 g \\ 0_{1*3} & 1 \end{bmatrix} \begin{bmatrix} R_{10} & t_{10}^* \\ 0_{1*3} & 1 \end{bmatrix}$$

Tracking filter unit 46 may filter the first set of information to compensate for unintentional movement of the device to generate a second set of information, the second set of information being indicative of angular velocity and movement of the device without unintentional movement (92). For example, mixing unit 60 of tracking filter unit 46 may receive the first set of information (e.g., possibly after conversion to vector form with matrix-vector converter 61) and receive information indicative of previously determined position and orientation of device 10 (e.g., predicted state in FIG. 3).

Mixing unit 60 may mix the received information indicative of previously determined position and orientation of the device and the first set of information to generate a mixed estimate of angular velocity and movement of the device. EKFs 62A-62C may apply one or more extended Kalman filters (EKFs) to the mixed estimate to generate one or more modeled motions. Model probability update unit 64 may determine model probabilities of the one or more modeled motions. Fusion unit 66 may fuse the model probabilities and the one or modeled motions to generate the second set of information (e.g., possibly with vector-matrix converter 67 converting to a matrix form) to generate T.

Image stabilization unit 44 may perform image stabilization on the current frame based on both the first set of information and the second set of information to generate an image stabilized current frame (94). For example, image stabilization unit 44 may perform $A*(T)^{-1}*T^{IM}*A^{-1}*[u0, v0, 1]^T$, wherein A is an intrinsic matrix, T is a matrix based on the first set of information, $T^{IM}$ is a matrix based on the second set of information, [u0, v0, 1] represents coordinate location of a pixel in the current frame prior to image stabilization.

VIO unit 50 may determine position and orientation and velocity information of camera device 10 based on image stabilized current frame and the subsequent frame (96). For example, image stabilization unit 44 may output the corrected frame to VIO unit 50, and VIO unit 50 may determine velocity, position and orientation of the device based on the image stabilized current frame (e.g., perform pre-integration and evaluate feature points) and the subsequent frame. For instance, the pose information and velocity may be based on movement of feature points between two frames. In some examples, VIO unit 50 may determine the movement of feature points between the image stabilized current frame and the subsequent frame.

IS/VIO unit 36 may output image stabilized current frame and information indicative of determined position and orientation (98). For example, image stabilization unit 44 may output, for display, the image stabilized current frame. VIO unit 50 may output information indicative of determined position and orientation, and in some examples, also include velocity information for augmented reality or virtual reality.

Figure 6:
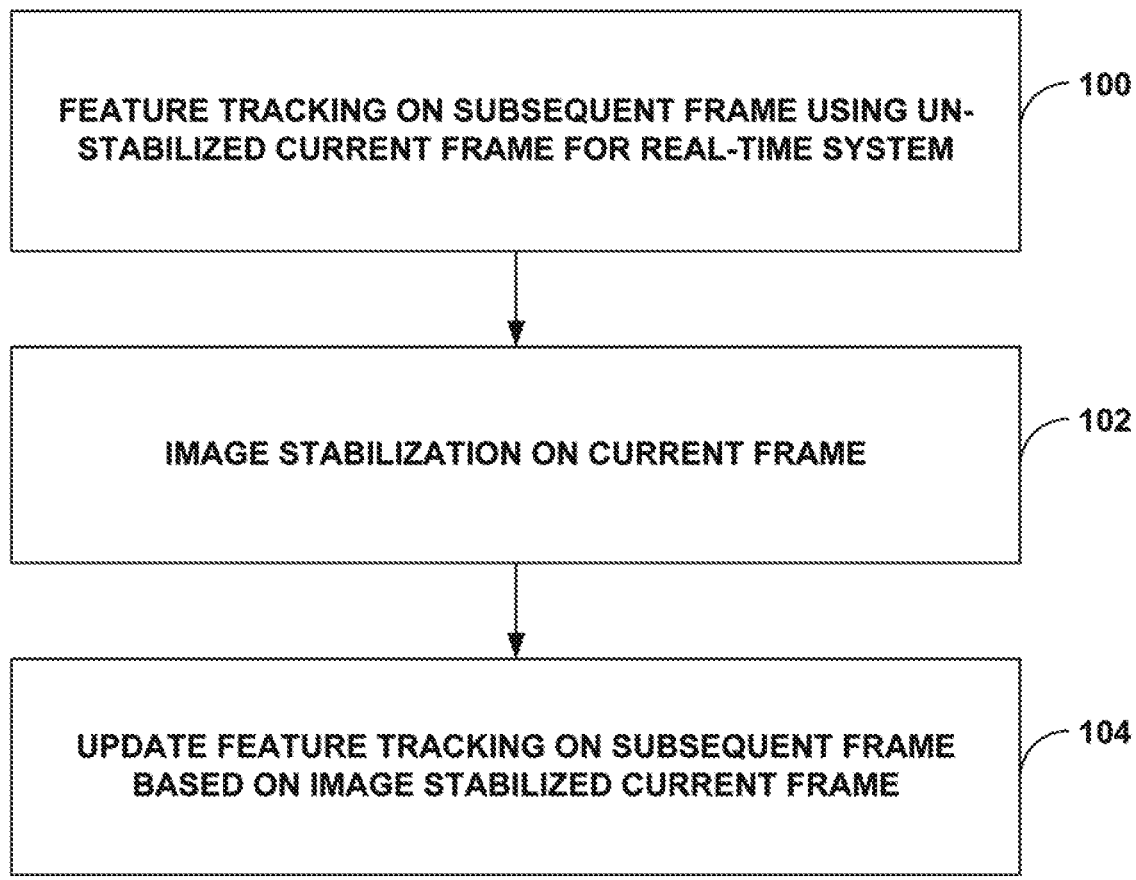
FIG. 6 is a flowchart illustrating another example method of operation in accordance with one or more examples described in this disclosure.

FIG. 6 is a flowchart illustrating an example method of operation in accordance with one or more examples described in this disclosure. As described above, in some examples, there is a one-frame latency in image stabilization for a current frame. For instance, a subsequent frame is used for image stabilizing the current frame, and then VIO is performed on the subsequent frame using the image stabilized current frame. For example, the image stabilizing is on frame n, but the VIO for determining pose and velocity information is for frame n+1 based on the image stabilized frame n.

However, in some examples, there may be a benefit in determining pose and velocity information in real-time, rather than waiting for image stabilization. In such examples, the pose and velocity information may be updated using the image stabilized frame.

For example, VIO unit 50 may perform feature tracking using feature points on the subsequent frame (e.g., frame n+1) using un-stabilized current frame (e.g., un-stabilized frame n) for a real-time system (100). That is, VIO unit 50 may perform techniques similar to those described above but with respect to un-stabilized current frame.

In parallel, image stabilization unit 44 may perform image stabilization on the current frame (e.g., frame n) (102). Image stabilization unit 44 may utilize the example techniques described in this disclosure to perform the image stabilization. VIO unit 50 may update feature tracking on subsequent frame based on image stabilized current frame (104). As one example, VIO unit 50 may limit feature tracking to feature points proximate to feature points identified during the feature tracking with the un-stabilized current frame using the image stabilized current frame, and determine pose and velocity information based on the tracked feature points.

The following describes example techniques that may be used together or separately.

Clause 1: A device for image processing includes a memory; and one or more processors coupled to the memory, the one or more processors configured to: receive a first set of information, the first set of information being indicative of angular velocity and movement of the device based on a change in position of the device across a current frame captured by the device and a subsequent frame captured by the device; filter the first set of information to compensate for unintentional movement of the device to generate a second set of information, the second set of information being indicative of angular velocity and movement of the device without unintentional movement; perform image stabilization on the current frame based on both the first set of information and the second set of information to generate an image stabilized current frame; and output, for display, the image stabilized current frame.

Clause 2: The device of clause 1, wherein the one or more processors are further configured to: determine velocity, position and orientation of the device based on the image stabilized current frame and the subsequent frame; and output information indicative of the determined velocity, position and orientation for augmented reality or virtual reality.

Clause 3: The device of any of clauses 1 and 2, wherein receiving the first set of information comprises receiving the information in a unified transform matrix with information indicative of angular velocity and movement of the device integrated into the unified transform matrix.

Clause 4: The device of any of clauses 1 through 3, wherein receiving the first set of information comprises: receiving angular velocity and movement of the device in Euclidean space; and transforming, with a Lie Group transform, the angular velocity and movement of the device in Euclidean space to exponential manifold space to generate the first set of information.

Clause 5: The device of any of clauses 1 through 4, wherein filtering the first set of information comprises: receiving information indicative of previously determined position and orientation of the device; mixing the received information indicative of previously determined position and orientation of the device and the first set of information to generate a mixed estimate of angular velocity and movement of the device; applying one or more extended Kalman filters (EKFs) to the mixed estimate to generate one or more modeled motions; determining model probabilities of the one or more modeled motions; and fusing the model probabilities and the one or modeled motions to generate the second set of information.

Clause 6: The device of any of clauses 1 through 5, wherein performing image stabilization comprises determining: $A*(T)-1*TIM*A-1*[u0, v0, 1]T$, wherein A is an intrinsic matrix, T is a matrix based on the first set of information, $T^{IM}$ is a matrix based on the second set of information, [u0, v0, 1] represents coordinate location of a pixel in the current frame prior to image stabilization.

Clause 7: The device of any of clauses 1 through 6, wherein the one or more processors are configured to receive angular velocity and movement information from an inertial movement unit (IMU) and filter the angular velocity and movement information to generate the first set of information.

Clause 8: The device of any of clauses 1 through 7, wherein the device comprises a mobile telephone having one or more cameras.

Clause 9: A method for image processing includes receiving a first set of information, the first set of information being indicative of angular velocity and movement of the device based on a change in position of the device across a current frame captured by the device and a subsequent frame captured by the device; filtering the first set of information to compensate for unintentional movement of the device to generate a second set of information, the second set of information being indicative of angular velocity and movement of the device without unintentional movement; performing image stabilization on the current frame based on both the first set of information and the second set of information to generate an image stabilized current frame; and outputting, for display, the image stabilized current frame.

Clause 10: The method of clause 9, further includes determining velocity, position and orientation of the device based on the image stabilized current frame and the subsequent frame; and outputting information indicative of the determined velocity, position and orientation.

Clause 11: The method of any of clauses 9 and 10, wherein receiving the first set of information comprises receiving the information in a unified transform matrix with information indicative of angular velocity and movement of the device integrated into the unified transform matrix.

Clause 12: The method of any of clauses 9 through 11, wherein receiving the first set of information comprises: receiving angular velocity and movement of the device in Euclidean space; and transforming, with a Lie Group transform, the angular velocity and movement of the device in Euclidean space to exponential manifold space to generate the first set of information.

Clause 13: The method of any of clauses 9 through 12, wherein filtering the first set of information comprises: receiving information indicative of previously determined position and orientation of the device; mixing the received information indicative of previously determined position and orientation of the device and the first set of information to generate a mixed estimate of angular velocity and movement of the device; applying one or more extended Kalman filters (EKFs) to the mixed estimate to generate one or more modeled motions; determining model probabilities of the one or more modeled motions; and fusing the model probabilities and the one or modeled motions to generate the second set of information.

Clause 14: The method of any of clauses 9 through 13, wherein performing image stabilization comprises determining: $A*(T)-1*TIM*A-1*[u0, v0, 1]T$, wherein A is an intrinsic matrix, T is a matrix based on the first set of information, TIM is a matrix based on the second set of information, [u0, v0, 1] represents coordinate location of a pixel in the current frame prior to image stabilization.

Clause 15: The method of any of clauses 9 through 14, further includes receiving angular velocity and movement information from an inertial movement unit (IMU) and filter the angular velocity and movement information to generate the first set of information.

Clause 16: A computer-readable storage medium storing instructions thereon that when executed cause one or more processors to: receive a first set of information, the first set of information being indicative of angular velocity and movement of the device based on a change in position of the device across a current frame captured by the device and a subsequent frame captured by the device; filter the first set of information to compensate for unintentional movement of the device to generate a second set of information, the second set of information being indicative of angular velocity and movement of the device without unintentional movement; perform image stabilization on the current frame based on both the first set of information and the second set of information to generate an image stabilized current frame; and output, for display, the image stabilized current frame.

Clause 17: The computer-readable storage medium of clause 16, further comprising instructions that cause the one or more processors to: determine velocity, position and orientation of the device based on the image stabilized current frame and the subsequent frame; and output information indicative of the determined velocity, position and orientation for augmented reality or virtual reality.

Clause 18: The computer-readable storage medium of any of clauses 16 and 17, wherein the instructions that cause the one or more processors to receive the first set of information comprise instructions that cause the one or more processors to receive the information in a unified transform matrix with information indicative of angular velocity and movement of the device integrated into the unified transform matrix.

Clause 19: The computer-readable storage medium of any of clauses 16 through 18, wherein the instructions that cause the one or more processors to receive the first set of information comprise instructions that cause the one or more processors to: receive angular velocity and movement of the device in Euclidean space; and transform, with a Lie Group transform, the angular velocity and movement of the device in Euclidean space to exponential manifold space to generate the first set of information.

Clause 20: The computer-readable storage medium of any of clauses 16 through 19, wherein instructions that cause the one or more processors to filter the first set of information comprise instructions that cause the one or more processors to: receive information indicative of previously determined position and orientation of the device; mix the received information indicative of previously determined position and orientation of the device and the first set of information to generate a mixed estimate of angular velocity and movement of the device; apply one or more extended Kalman filters (EKFs) to the mixed estimate to generate one or more modeled motions; determine model probabilities of the one or more modeled motions; and fuse the model probabilities and the one or modeled motions to generate the second set of information.

Clause 21: The computer-readable storage medium of any of clauses 16 through wherein the instructions that cause the one or more processors to perform image stabilization comprise instructions that cause the one or more processors to determine: A*(T)−1*TIM*A−1*[u0, v0, 1]T, wherein A is an intrinsic matrix, T is a matrix based on the first set of information, TIM is a matrix based on the second set of information, [u0, v0, 1] represents coordinate location of a pixel in the current frame prior to image stabilization.

Clause 22: The computer-readable storage medium of any of clauses 16 through 21, further comprising instructions that cause the one or more processors to: receive angular velocity and movement information from an inertial movement unit (IMU) and filter the angular velocity and movement information to generate the first set of information.

Clause 23: A device for image processing includes means for receiving a first set of information, the first set of information being indicative of angular velocity and movement of the device based on a change in position of the device across a current frame captured by the device and a subsequent frame captured by the device; means for filtering the first set of information to compensate for unintentional movement of the device to generate a second set of information, the second set of information being indicative of angular velocity and movement of the device without unintentional movement; means for performing image stabilization on the current frame based on both the first set of information and the second set of information to generate an image stabilized current frame; and means for outputting, for display, the image stabilized current frame.

Clause 24: The device of clause 23, further includes means for determining velocity, position and orientation of the device based on the image stabilized current frame and the subsequent frame; and means for outputting information indicative of the determined velocity, position and orientation.

Clause 25: The device of any of clauses 23 and 24, wherein the means for receiving the first set of information comprises means for receiving the information in a unified transform matrix with information indicative of angular velocity and movement of the device integrated into the unified transform matrix.

Clause 26: The device of any of clauses 23 through 25, wherein the means for receiving the first set of information comprises: means for receiving angular velocity and movement of the device in Euclidean space; and means for transforming, with a Lie Group transform, the angular velocity and movement of the device in Euclidean space to exponential manifold space to generate the first set of information.

Clause 27: The device of any of clauses 23 through 26, wherein filtering the first set of information comprises: means for receiving information indicative of previously determined position and orientation of the device; means for mixing the received information indicative of previously determined position and orientation of the device and the first set of information to generate a mixed estimate of angular velocity and movement of the device; means for applying one or more extended Kalman filters (EKFs) to the mixed estimate to generate one or more modeled motions; means for determining model probabilities of the one or more modeled motions; and means for fusing the model probabilities and the one or modeled motions to generate the second set of information.

Clause 28: The device of any of clauses 23 through 27, wherein the means for performing image stabilization comprises means for determining: A*(T)−1*TIM*A−1*[u0, v0, 1]T, wherein A is an intrinsic matrix, T is a matrix based on the first set of information, TIM is a matrix based on the second set of information, [u0, v0, 1] represents coordinate location of a pixel in the current frame prior to image stabilization.

Clause 29: The device of any of clauses 23 through 28, further includes means for receiving angular velocity and movement information from an inertial movement unit (IMU) and filter the angular velocity and movement information to generate the first set of information.

Clause 30: The device of any of clauses 23 through 29, wherein the device comprises a mobile telephone having one or more cameras.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A device for image processing, the device comprising:
   a memory; and
   one or more processors coupled to the memory, the one or more processors configured to:
      receive a first set of information, the first set of information being indicative of angular velocity and movement of the device based on a change in position of the device across a current frame captured by the device and a subsequent frame captured by the device;
      filter the first set of information to compensate for unintentional movement of the device to generate a second set of information, the second set of information being indicative of angular velocity and movement of the device without unintentional movement;
      perform image stabilization on the current frame based on both the first set of information and the second set of information to generate an image stabilized current frame; and
      output, for display, the image stabilized current frame.

2. The device of claim 1, wherein the one or more processors are further configured to:
   determine velocity, position and orientation of the device based on the image stabilized current frame and the subsequent frame; and
   output information indicative of the determined velocity, position and orientation for augmented reality or virtual reality.

3. The device of claim 1, wherein receiving the first set of information comprises receiving the information in a unified transform matrix with information indicative of angular velocity and movement of the device integrated into the unified transform matrix.

4. The device of claim 1, wherein receiving the first set of information comprises:
   receiving angular velocity and movement of the device in Euclidean space; and
   transforming, with a Lie Group transform, the angular velocity and movement of the device in Euclidean space to exponential manifold space to generate the first set of information.

5. The device of claim 1, wherein filtering the first set of information comprises:
   receiving information indicative of previously determined position and orientation of the device;
   mixing the received information indicative of previously determined position and orientation of the device and the first set of information to generate a mixed estimate of angular velocity and movement of the device;
   applying one or more extended Kalman filters (EKFs) to the mixed estimate to generate one or more modeled motions;
   determining model probabilities of the one or more modeled motions; and
   fusing the model probabilities and the one or modeled motions to generate the second set of information.

6. The device of claim 1, wherein performing image stabilization comprises determining:
   $A*(T)^{-1}*T^{IM}*A^{-1}*[u0, v0, 1]^T$, wherein A is an intrinsic matrix, T is a matrix based on the first set of information, $T^{IM}$ is a matrix based on the second set of information, [u0, v0, 1] represents coordinate location of a pixel in the current frame prior to image stabilization.

7. The device of claim 1, wherein the one or more processors are configured to receive angular velocity and movement information from an inertial movement unit (IMU) and filter the angular velocity and movement information to generate the first set of information.

8. The device of claim 1, wherein the device comprises a mobile telephone having one or more cameras.

9. A method for image processing, the method comprising:
- receiving a first set of information, the first set of information being indicative of angular velocity and movement of a device based on a change in position of the device across a current frame captured by the device and a subsequent frame captured by the device;
- filtering the first set of information to compensate for unintentional movement of the device to generate a second set of information, the second set of information being indicative of angular velocity and movement of the device without unintentional movement;
- performing image stabilization on the current frame based on both the first set of information and the second set of information to generate an image stabilized current frame; and
- outputting, for display, the image stabilized current frame.

10. The method of claim 9, further comprising:
- determining velocity, position and orientation of the device based on the image stabilized current frame and the subsequent frame; and
- outputting information indicative of the determined velocity, position and orientation.

11. The method of claim 9, wherein receiving the first set of information comprises receiving the information in a unified transform matrix with information indicative of angular velocity and movement of the device integrated into the unified transform matrix.

12. The method of claim 9, wherein receiving the first set of information comprises:
- receiving angular velocity and movement of the device in Euclidean space; and
- transforming, with a Lie Group transform, the angular velocity and movement of the device in Euclidean space to exponential manifold space to generate the first set of information.

13. The method of claim 9, wherein filtering the first set of information comprises:
- receiving information indicative of previously determined position and orientation of the device;
- mixing the received information indicative of previously determined position and orientation of the device and the first set of information to generate a mixed estimate of angular velocity and movement of the device;
- applying one or more extended Kalman filters (EKFs) to the mixed estimate to generate one or more modeled motions;
- determining model probabilities of the one or more modeled motions; and
- fusing the model probabilities and the one or modeled motions to generate the second set of information.

14. The method of claim 9, wherein performing image stabilization comprises determining:
$A*(T)^{-1}*T^{IM}*A^{-1}*[u0, v0, 1]^T$, wherein A is an intrinsic matrix, T is a matrix based on the first set of information, $T^{IM}$ is a matrix based on the second set of information, [u0, v0, 1] represents coordinate location of a pixel in the current frame prior to image stabilization.

15. The method of claim 9, further comprising:
- receiving angular velocity and movement information from an inertial movement unit (IMU) and filter the angular velocity and movement information to generate the first set of information.

16. A computer-readable storage medium storing instructions thereon that when executed cause one or more processors to:
- receive a first set of information, the first set of information being indicative of angular velocity and movement of a device based on a change in position of the device across a current frame captured by the device and a subsequent frame captured by the device;
- filter the first set of information to compensate for unintentional movement of the device to generate a second set of information, the second set of information being indicative of angular velocity and movement of the device without unintentional movement;
- perform image stabilization on the current frame based on both the first set of information and the second set of information to generate an image stabilized current frame; and
- output, for display, the image stabilized current frame.

17. The computer-readable storage medium of claim 16, further comprising instructions that cause the one or more processors to:
- determine velocity, position and orientation of the device based on the image stabilized current frame and the subsequent frame; and
- output information indicative of the determined velocity, position and orientation for augmented reality or virtual reality.

18. The computer-readable storage medium of claim 16, wherein the instructions that cause the one or more processors to receive the first set of information comprise instructions that cause the one or more processors to receive the information in a unified transform matrix with information indicative of angular velocity and movement of the device integrated into the unified transform matrix.

19. The computer-readable storage medium of claim 16, wherein the instructions that cause the one or more processors to receive the first set of information comprise instructions that cause the one or more processors to:
- receive angular velocity and movement of the device in Euclidean space; and
- transform, with a Lie Group transform, the angular velocity and movement of the device in Euclidean space to exponential manifold space to generate the first set of information.

20. The computer-readable storage medium of claim 16, wherein instructions that cause the one or more processors to filter the first set of information comprise instructions that cause the one or more processors to:
- receive information indicative of previously determined position and orientation of the device;
- mix the received information indicative of previously determined position and orientation of the device and the first set of information to generate a mixed estimate of angular velocity and movement of the device;
- apply one or more extended Kalman filters (EKFs) to the mixed estimate to generate one or more modeled motions;
- determine model probabilities of the one or more modeled motions; and
- fuse the model probabilities and the one or modeled motions to generate the second set of information.

21. The computer-readable storage medium of claim 16, wherein the instructions that cause the one or more processors to perform image stabilization comprise instructions that cause the one or more processors to determine:
$A*(T)^{-1}*T^{IM}*A^{-1}*[u0, v0, 1]^T$, wherein A is an intrinsic matrix, T is a matrix based on the first set of information, $T^{IM}$ is a matrix based on the second set of information, [u0, v0, 1] represents coordinate location of a pixel in the current frame prior to image stabilization.

22. The computer-readable storage medium of claim 16, further comprising instructions that cause the one or more processors to:
receive angular velocity and movement information from an inertial movement unit (IMU) and filter the angular velocity and movement information to generate the first set of information.

23. A device for image processing, the device comprising:
means for receiving a first set of information, the first set of information being indicative of angular velocity and movement of the device based on a change in position of the device across a current frame captured by the device and a subsequent frame captured by the device;
means for filtering the first set of information to compensate for unintentional movement of the device to generate a second set of information, the second set of information being indicative of angular velocity and movement of the device without unintentional movement;
means for performing image stabilization on the current frame based on both the first set of information and the second set of information to generate an image stabilized current frame; and
means for outputting, for display, the image stabilized current frame.

24. The device of claim 23, further comprising:
means for determining velocity, position and orientation of the device based on the image stabilized current frame and the subsequent frame; and
means for outputting information indicative of the determined velocity, position and orientation.

25. The device of claim 23, wherein the means for receiving the first set of information comprises means for receiving the information in a unified transform matrix with information indicative of angular velocity and movement of the device integrated into the unified transform matrix.

26. The device of claim 23, wherein the means for receiving the first set of information comprises:
means for receiving angular velocity and movement of the device in Euclidean space; and
means for transforming, with a Lie Group transform, the angular velocity and movement of the device in Euclidean space to exponential manifold space to generate the first set of information.

27. The device of claim 23, wherein filtering the first set of information comprises:
means for receiving information indicative of previously determined position and orientation of the device;
means for mixing the received information indicative of previously determined position and orientation of the device and the first set of information to generate a mixed estimate of angular velocity and movement of the device;
means for applying one or more extended Kalman filters (EKFs) to the mixed estimate to generate one or more modeled motions;
means for determining model probabilities of the one or more modeled motions; and
means for fusing the model probabilities and the one or more modeled motions to generate the second set of information.

28. The device of claim 23, wherein the means for performing image stabilization comprises means for determining:
$A*(T)^{-1}*T^{IM}*A^{-1}*[u0, v0, 1]^T$, wherein A is an intrinsic matrix, T is a matrix based on the first set of information, $T^{IM}$ is a matrix based on the second set of information, [u0, v0, 1] represents coordinate location of a pixel in the current frame prior to image stabilization.

29. The device of claim 23, further comprising:
means for receiving angular velocity and movement information from an inertial movement unit (IMU) and filter the angular velocity and movement information to generate the first set of information.

30. The device of claim 23, wherein the device comprises a mobile telephone having one or more cameras.

* * * * *